(12) United States Patent
Kawasaki et al.

(10) Patent No.: US 6,332,145 B1
(45) Date of Patent: *Dec. 18, 2001

(54) METHOD FOR CREATING BROWSING DATA OF AN INFORMATION SEARCHING APPARATUS AND METHOD FOR SEARCHING INFORMATION

(75) Inventors: Kenji Kawasaki, Yokohama; Tetsuo Tanaka, Sagamihara; Yoshiaki Morimoto; Kunihisa Nitta, both of Yokohama; Kimio Tanaka, Hadano, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/394,046

(22) Filed: Sep. 13, 1999

Related U.S. Application Data

(62) Division of application No. 08/592,033, filed on Jan. 26, 1996, now Pat. No. 6,009,438.

(30) Foreign Application Priority Data

Jan. 31, 1995 (JP) .................................................. 7-013967

(51) Int. Cl.[7] ...................................................... G06F 17/30
(52) U.S. Cl. ........................................................... 707/104
(58) Field of Search ................................... 707/104, 4, 3; 399/133; 709/203, 226; 395/173

(56) References Cited

U.S. PATENT DOCUMENTS 3,654,609   4/1972   Bluethman et al. .................. 395/117

(List continued on next page.)

FOREIGN PATENT DOCUMENTS

| 6-251078 | 2/1993 | (JP) . |
| 7-028689 | 7/1993 | (JP) . |
| 7-28689  | 1/1995 | (JP) . |

OTHER PUBLICATIONS

Grosky et al., "Content–Based Hypermedia–Intelligent Browsing of Structured Media Objects," Signals, Systems and Computers, 1994, Conf. Record of the Twenty–Eight Asilomar Conf., v.2, 1336–1340.*

Engberts et al., "COBOL/SRE: A COBOL Systems Renovation Environment," Computer–Aided Software Engineering, CASE '93, pp. 199–210.*

Gabbe et al., "Towards Intelligent Recognition of Multimedia Episodes in Real–Time Applications," Proceedings of the Second ACM Int'l Conf. on Multimedia '94, pp. 227–236, Oct. 15, 1994.*

*Primary Examiner*—Thomas Black
*Assistant Examiner*—Charles L. Rones
(74) *Attorney, Agent, or Firm*—Mattingly, Stanger & Malur, P.C.

(57) ABSTRACT

A browsing data creation system of an information searching apparatus includes a data storage for storing plural kinds of data that are to be searched for. Each of the data having a data format corresponding to the kind of data that it is. Instructions can be input into the information searching apparatus and browsing data can be created from the data stored in the data storage according to a data format input into the information searching apparatus. Data that is to be searched for has a time based access and is divided into page units. An instruction is input to the information searching apparatus to search in page units.

6 Claims, 19 Drawing Sheets

U.S. PATENT DOCUMENTS

| | | | |
|---|---|---|---|
| 4,509,138 | 4/1985 | Hayashi et al. | 707/530 |
| 5,031,121 | 7/1991 | Iwagi et al. | 707/515 |
| 5,031,346 | 7/1991 | Herring et al. | 40/463 |
| 5,165,016 | 11/1992 | Takahashi et al. | 395/508 |
| 5,165,103 | 11/1992 | Takeda et al. | 382/305 |
| 5,179,658 | 1/1993 | Izawa et al. | 395/514 |
| 5,204,947 * | 4/1993 | Bernstein et al. | 345/357 |
| 5,229,866 | 7/1993 | Kashiwagi et al. | 358/444 |
| 5,291,587 | 3/1994 | Kodosky et al. | 395/500 |
| 5,313,574 | 5/1994 | Beethe | 385/142 |
| 5,321,802 | 6/1994 | Furuya et al. | 358/403 |
| 5,428,730 | 6/1995 | Baker et al. | 395/335 |
| 5,517,652 | 5/1996 | Miyamoto et al. | 709/219 |
| 5,530,864 | 6/1996 | Matheny et al. | 546/389 |
| 5,543,930 | 8/1996 | Takano | 386/46 |
| 5,544,354 | 8/1996 | May et al. | 707/4 |
| 5,551,055 | 8/1996 | Matheny et al. | 710/62 |
| 5,586,316 * | 12/1996 | Tanaka et al. | 707/4 |
| 5,657,433 * | 8/1997 | Murase et al. | 395/133 |
| 5,678,001 * | 10/1997 | Nagel et al. | 273/237 |
| 5,701,400 | 12/1997 | Amado | 706/45 |
| 5,732,216 | 3/1998 | Logan et al. | 709/203 |
| 5,771,380 * | 6/1998 | Tanaka et al. | 707/104 |
| 5,799,063 | 8/1998 | Krane | 379/88.17 |
| 5,809,250 | 9/1998 | Kisor | 709/227 |
| 5,819,301 * | 10/1998 | Rowe et al. | 707/513 |
| 5,860,074 * | 1/1999 | Rowe et al. | 707/526 |
| 5,870,549 | 2/1999 | Bobo, II | 709/206 |
| 5,890,162 | 3/1999 | Huckins | 707/104 |
| 5,893,110 * | 4/1999 | Weber et al. | 707/104 |
| 5,911,138 * | 6/1999 | Li et al. | 707/3 |
| 5,970,499 * | 10/1999 | Smith et al. | 707/104 |
| 5,983,222 * | 11/1999 | Morimoto et al. | 707/6 |
| 6,009,438 * | 12/1999 | Kawasaki et al. | 707/104 |
| 6,094,655 * | 7/2000 | Rogers et al. | 707/10 |
| 6,105,066 * | 8/2000 | Hayes, Jr. | 709/226 |
| 6,125,385 * | 9/2000 | Wies et al. | 709/203 |
| 6,169,547 * | 1/2001 | Tanaka | 345/348 |

* cited by examiner

FIG. 7

| BROWSING DATA NAME | APPLICATION DATA NAME | APPLICATION DATA KIND |
|---|---|---|
| c: ¥ browser ¥ test, txt ¥ brdata | c: ¥ test, txt | TEXT |
| c: ¥ browser ¥ car, avi ¥ brdata | c: ¥ car, avi | VIDEO |
| c: ¥ browser ¥ tiger, wav ¥ brdata | c: ¥ tiger, wav | AUDIO |

| APPLICATION DATA KIND | BROWSING DATA FORMAT | MAXIMUM NUMBER OF PAGES |
|---|---|---|
| WORD PROCESSOR DATA | TEXT | 10 |
| SPREAD SHEET DATA | BITMAP | 3 |
| DRAW TOOL DATA | GRAPHIC | 5 |

10010, 10020, 10030

METHOD FOR CREATING BROWSING DATA OF AN INFORMATION SEARCHING APPARATUS AND METHOD FOR SEARCHING INFORMATION

This is a divisional application of U.S. Ser. No. 08/592,033, filed Jan. 26, 1996 now U.S. Pat. No. 6,009,438 issued Dec. 28, 1999.

BACKGROUND OF THE INVENTION

The present invention relates to a method for creating browsing data of an information searching apparatus which is realized on an information processor such as a work station or a personal computer handling various data such as a text, spread sheet, graph, bitmap, video, audio, etc. and a method for searching information and particularly to a method for creating browsing data which can easily create browsing data and a method for searching information suited to play a part of video and audio. Furthermore, the present invention relates to a method for searching information which imposes little burden on the hardware even when large capacity data is searched.

In an information processor such as a work station or a personal computer, data such as a text, document, spread sheet, graph, bitmap, or graphic which is created by an application program is stored in a memory such as a disk as a file (hereinafter these data are called "application data"). By designating the name of a file or selecting an icon corresponding to the file (which is expressed as a small picture so as to make the content thereof easily understandable intuitively), an operator can designate the file to be accessed. In this case, the operator designates the necessary file by associating the file name or the icon picture with the file content.

However, a general icon comprises a picture determined for each application which is used for creation of a file and the file name, so that it is difficult to grasp the content of the file fully only by these pieces of information.

In the art (the prior art 1) described in the specification of Japanese Laid-open Patent Publication No. 5-33020 (1993), as data for grasping the content of each file (hereinafter, this data is referred to as "browsing data" and grasping the content of a file by referring to this data is referred to as "browsing"), reduced image data of the file content is created and the image data is displayed as an icon. By doing this, without invoking the application program creating the file, the content of the application data can be grasped.

In the art (the prior art 2) described in the specification of Japanese Laid-open Patent Publication No. 5-170021 (1993), browsing data is created by performing an image operation for displaying the application data on the display and moving it or by using data to be outputted to a printer. By doing this, without changing the application program at all, data corresponding to the unique data of the application program can be created. Even if application data extends over a plurality of pages, the content can be grasped by flipping pages.

On the other hand, recently, audio data and video data are often handled on a computer as the disk capacity increases and the CPU performance improves. These data are played with audio along the time axis unlike conventional data, so that the content thereof cannot be grasped only by display on the display unit like a conventional still image. Therefore, when these time-based data are selected for conventional browsing, the content thereof is indicated by playing the whole or a part of the data.

The aforementioned prior art 1 is a basic art of browsing and the aforementioned prior art 2 is intended to allow a user to create browsing data simply in addition to the prior art 1. However, in the prior art 2, to create browsing data from the screen to be displayed on, it is necessary to display the application data to be displayed on the display screen beforehand. Therefore, to create browsing data in batch immediately before browsing, it is necessary to invoke the application first and display each application data on the screen, so that a problem arises that it is troublesome.

In the prior art 2, to create browsing data from data to be outputted to a printer, it is premised that a printing function is added to the application. As a result, a problem arises that browsing data cannot be created from application data having no printing function.

In the prior art 2, when browsing data is created, the browsing data is always saved as bitmap data. When data of the same content is saved, the amount of bitmap data is larger than that of text data or graphic data. As a result, when browsing data of many files is created, the total of amounts of browsing data increases. Therefore, a problem arises that to save browsing data, a large capacity memory is necessary.

In the prior art 2, when the content of a file is read by flipping pages, there is no upper limit to the number of pages of browsing data to be created. As a result, when application data has a large amount of pages, browsing data also has a large amount of pages and the amount of browsing data increases. Therefore, a problem arises that to save browsing data, a large capacity memory is necessary.

When the whole of time-based data is played for browsing it and the playing time of the data is extremely long, a problem arises that unless the playing time of one data ends, the next data cannot be browsed, and the browsing efficiency lowers, and the operability gets worse. On the other hand, when only a part of the data is played, it is difficult to automatically extract the appropriate characteristic part of the data, so that it may be considered to be difficult to search for the target data efficiently.

SUMMARY OF THE INVENTION

The present invention is intended to solve the aforementioned problems and an object of the present invention is to provide a method for creating browsing data of an information searching apparatus which can create browsing data simply by using the existing art so as to create the browsing data.

Another object of the present invention is to provide a method for searching information for minimizing the capacity of a memory necessary to save browsing data of a large amount of files even when the browsing data is created because the format of browsing data to be created can be changed.

Still another object of the present invention is to provide a method for searching information for browsing video and audio by designating only the part to be browsed.

A further object of the present invention is to provide a method for searching information for minimizing the capacity of a memory necessary to save browsing data by having a maximum value of the capacity of browsing data even if the original application data is large.

To accomplish the above objects, in the browsing data creation method of the information searching apparatus of the present invention having a data storage means for storing data to be searched for, an input means for inputting an instruction to the information searching apparatus, a browsing data creation means for creating browsing data from the aforementioned browsing data, and an output means for outputting the aforementioned browsing data, the constitution of the present invention is that the present invention has an input means for selecting the format of data to be acquired when data in a specific format is acquired from certain data so as to create browsing data and creates the aforementioned browsing data from the aforementioned data to be searched for in accordance with the data format selected by the input means.

More in detail, in the browsing data creation method of the information searching apparatus, the means for creating the browsing data from the data to be searched for in accordance with the data format selected by the input means for selecting the data format to be acquired is a means for creating a compound document or a means for creating a clip board.

To accomplish the above objects, the constitution of the present invention relating to the browsing data creation method of the information searching apparatus is that when the browsing data is data requiring a lot of time for play, the method divides the browsing data in page units and instructs output for searching in page units by the input means.

More in detail, in the information searching method of the information searching apparatus, the aforementioned division in page units is obtained by dividing the playing time of the browsing data equally.

In detail, in the information searching method of the information searching apparatus, the aforementioned division in page units is obtained by allocating pages on the assumption that the playing time of the browsing data is constant.

To accomplish the above objects, another constitution of the present invention relating to the browsing data creation method of the information searching apparatus is that when the browsing data is data requiring a lot of time for play and an emblem for instructing the output means when the browsing data is played is displayed, the browsing data is played when the emblem is instructed by the input means.

Next, to accomplish the above objects, another constitution of the present invention relating to the browsing data creation method of the information searching apparatus is that the information searching apparatus has a means for inputting the upper limit of the number of pages created by the browsing data creation means when the browsing data can be searched by page and the inputted upper limit of the number of pages is the upper limit of the number of pages of the created browsing data. Another constitution relating to the browsing data creation method of the information searching apparatus of the present invention is that the information searching apparatus has a data storage means for storing browsing data and when the browsing data can be searched by page, the created upper limit of the number of pages of the browsing data is determined by the capacity which can be allocated so as to store the browsing data of the data storage means.

According to the present invention, to create browsing data in the data format selected by a user from the unique data of the application program, the compound document program is used. Therefore, when the application data created by the application can be handled by the compound document program, the operation for displaying the application in the window one by one is not necessary and furthermore, browsing data can be created even from application data having no printing function. The format for browsing data to be created can be selected, so that browsing data in the data format which is considered to be most suitable to browsing by a user can be created. Furthermore, even when browsing data of many files are created, the data format for reducing the amount of browsing data can be selected and the capacity of a disk necessary for saving browsing data can be saved.

A concept of a virtual page is provided for audio and video data and data can be browsed in page units, so that audio and video data can be browsed by a method equivalent to that for document data having a plurality of pages.

Therefore, it is easy to understand by a user and only a desired portion can be played, so that a user interface which is easy to use can be provided.

Audio and video data are played only when icons indicating play thereof are instructed, so that only a portion where audio and video data are to be watched and heard can be played simply.

Since an upper limit is provided to the number of pages which can be registered as browsing data, even if the amount of application data is large, the amount of application data can be prevented from increasing excessively and the capacity of a disk necessary to save browsing data can be saved.

BRIEF DESCRIPTION OF THE DRAWINGS

FIG. 7 is a schematic view of the browsing data management table;

FIG. 9 is a schematic view of the registration setting table;

DETAILED DESCRIPTION OF THE PREFERRED EMBODIMENTS

The embodiments of the present invention will be explained hereunder with reference to FIGS. 1 to 20.

Hardware constitution and software constitution of the information searching apparatus Firstly, the hardware constitution and software constitution of the information searching apparatus of the present invention will be explained with reference to FIGS. 1 to 3. Firstly, the hardware constitution of the information searching apparatus will be explained with reference to FIG. 2.

Figure 2:
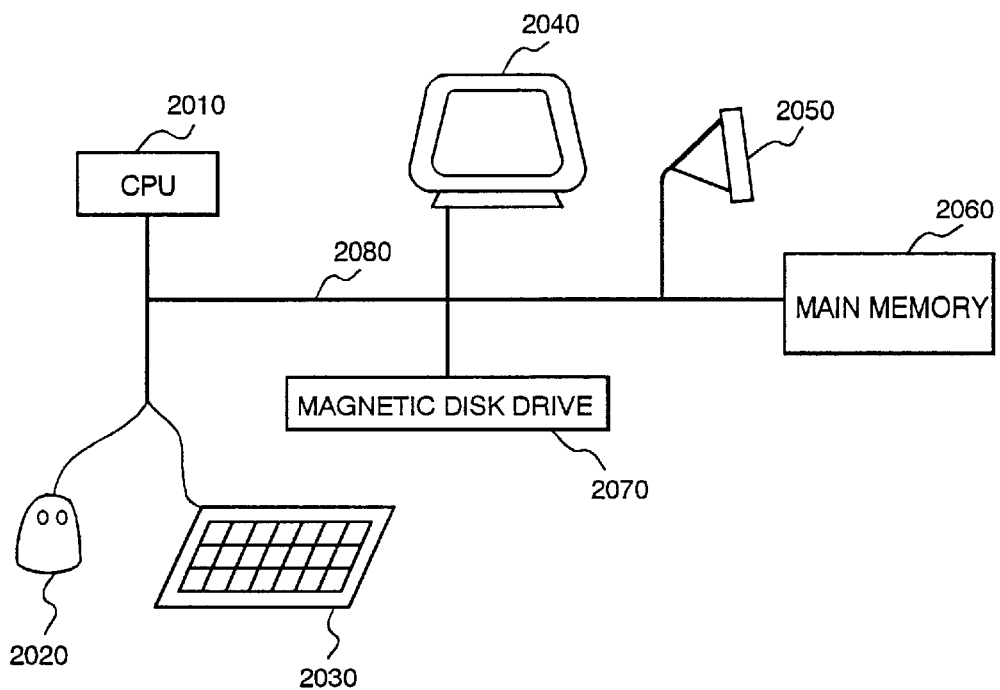
FIG. 2 is a schematic view showing the hardware constitution of the information searching apparatus of the present invention.

FIG. 2 is a schematic view showing the hardware constitution of the information searching apparatus of the present invention.

A CPU (central processing unit) 2010 controls the whole hardware and executes the programs. A mouse 2020 and a keyboard 2030 are input units which are used to select an optional process or input data by a user. A touch panel or track ball can be used as an input unit. A display 2040 is an output unit for displaying a search result or system information on the screen and a speaker 2050 is an output unit for outputting audio.

A magnetic disk drive 2070 is an auxiliary memory for saving data and programs. A main memory 2060 generally comprises a RAM (random access memory) and a program to be executed is loaded here and work data in execution is also stored here.

These units 2010 to 2070 are connected to each other via a bus 2080 and data is transferred between the units 2010 to 2080 by using the bus 2080.

Next, the software constitution of the information searching apparatus of the present invention will be explained with reference to FIG. 1.

Figure 1:
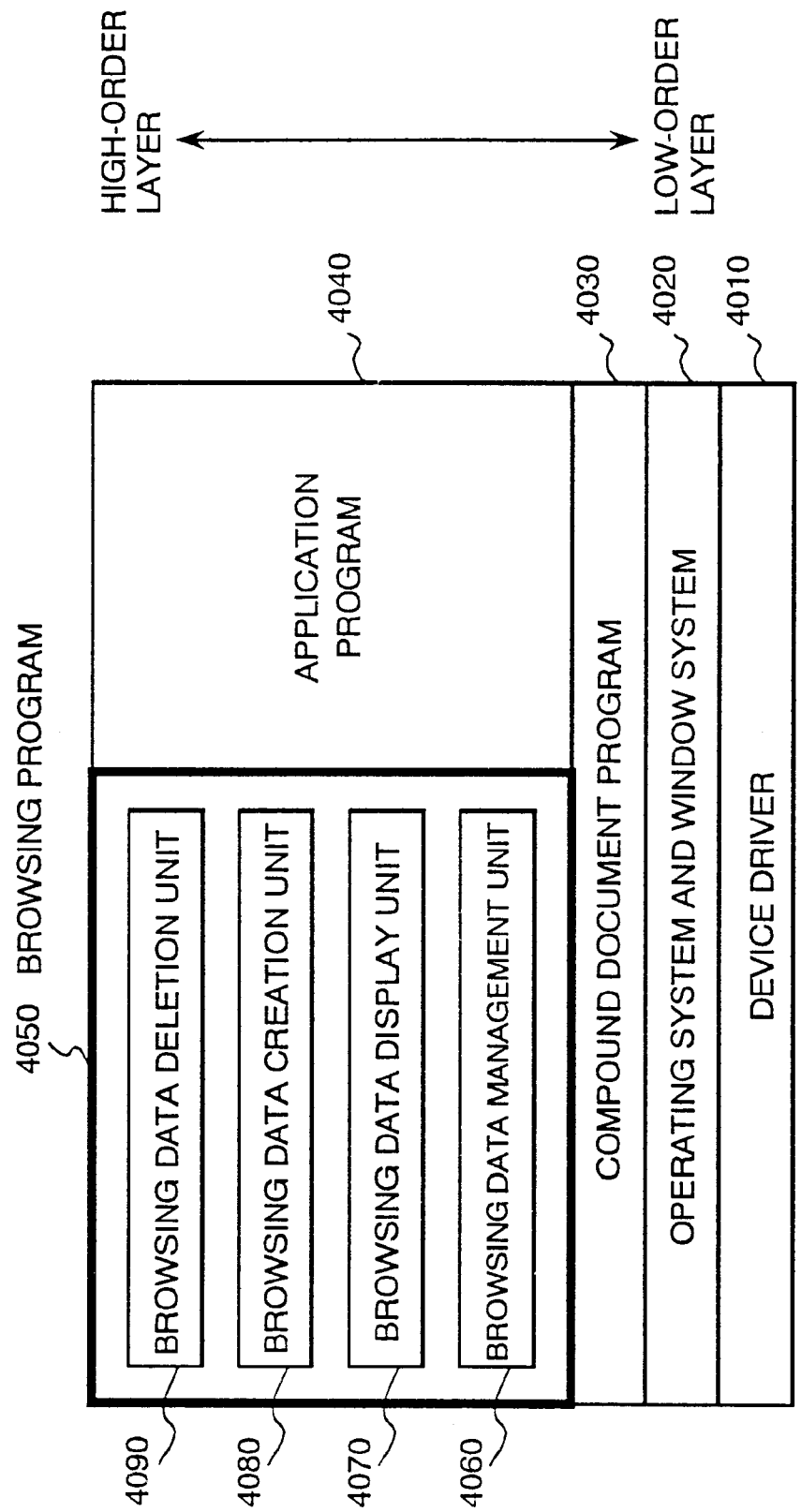
FIG. 1 is a schematic view showing the software constitution of the information searching apparatus of the present invention.

FIG. 1 is a schematic view showing the software constitution of the information searching apparatus of the present invention.

The drawing shows a hierarchical structure and each lower order unit has a program function closer to the hardware. A device driver 4010 is a program for controlling the keyboard 2030, the mouse 2020, the magnetic disk drive 2070, and the speaker 2050 which are hardware devices.

The operating system (hereinafter abbreviated to OS) is a program for controlling the whole system by mediating between an application program and the hardware. Particularly, a program for controlling a window displayed on the display 2040 is called a window system.

A compound document program 4030 is a program for creating an object combined with the designated application data file and acquiring the object content in the designated data format. The compound document program will be explained later in detail.

Application programs 4040 are various application programs operating in the OS. Browsing programs 4050 are programs for realizing browsing for information search of the present invention and comprise a browsing data management unit 4060, a browsing data display unit 4070, a browsing data creation unit 4080, and a browsing data deletion unit 4090. These programs are loaded and executed in the main memory 2060 when the information searching apparatus is in operation.

Next, information stored in the magnetic disk drive of the information searching apparatus of the present invention will be explained with reference to FIG. 3. FIG. 3 is a schematic view of data and programs stored in the magnetic disk drive of the information searching apparatus of the present invention.

Figure 3:
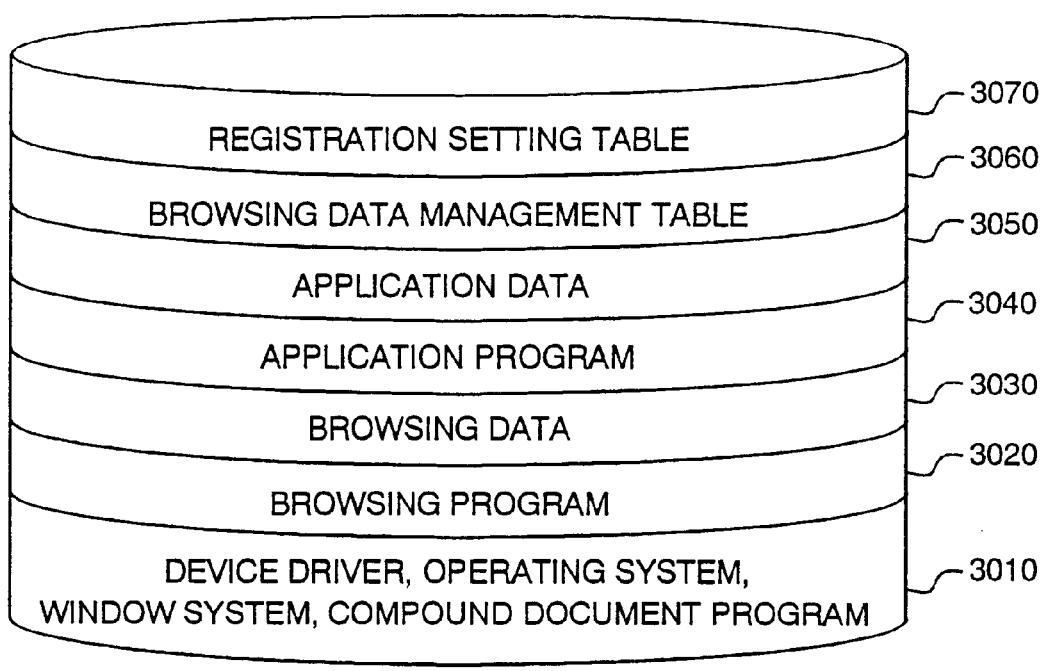
FIG. 3 is a schematic view of data and programs stored in the magnetic disk drive of the information searching apparatus of the present invention.

The data and programs shown in FIG. 3 are stored in the magnetic disk drive 2070. Namely, the programs such as the device driver, operating system, window system, compound document program, browsing programs, and application programs mentioned above are stored so as to be loaded at the time of execution.

As data, browsing data 3020 used for browsing, application data 3050 used by the application programs, a registration and setting table 3070 used for control by the browsing programs, and a browsing data management table 3060 are stored. The registration and setting table is a table for saving creation conditions for browsing data and the browsing data registration management table is a table for associating the application data and the browsing data. The registration and setting table and the browsing data registration management table will be explained later in detail with reference to FIG. 9 and FIG. 7 respectively.

User interface of the information searching apparatus

Next, the user interface of the information searching apparatus of the present invention will be explained with reference to FIGS. 4 and 5.

Figure 4:
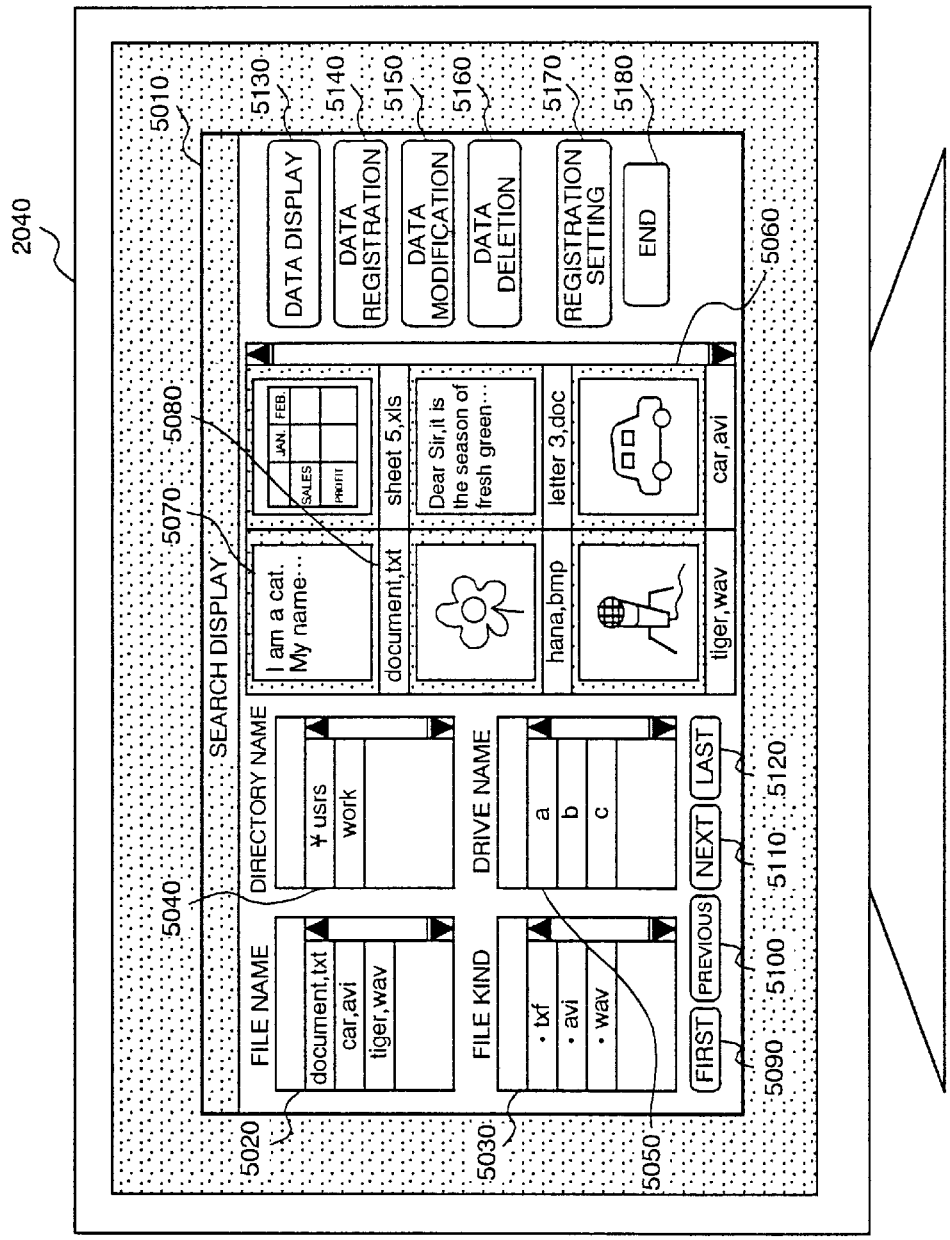
FIG. 4 is a drawing showing a search display screen example of browsing data which is displayed on the display device 2040.
Figure 5:
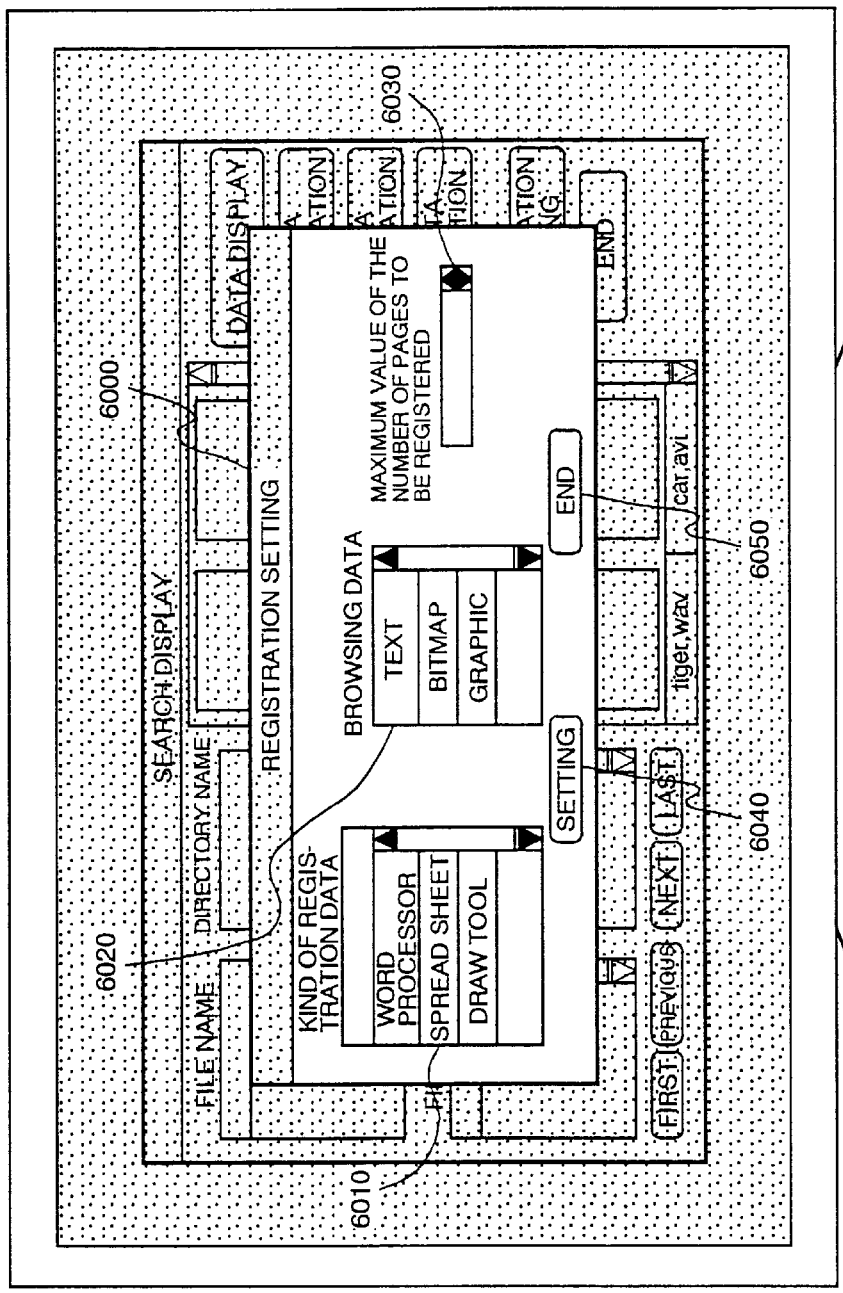
FIG. 5 is a drawing showing the registration setting screen of browsing data which is displayed on the display device 2040.

FIG. 4 is a drawing showing a search display screen example of browsing data which is displayed on the display device 2040.

The information searching apparatus of the present invention browses various searching objects and in addition to a text file and a bitmap file which are displayed on the screen, video and audio also can be browsed.

A search display screen 5010 is displayed immediately after the browsing program is invoked and comprises areas 5020 to 5050 for selecting a browsing object, areas 5090 to 5120 for instructing the browsing position, an area 5160 for displaying browsing data and instructing the browsing timing, and areas 5130 to 5180 for inputting a command.

The information of a file to be browsed comprises a file name 5020, a file kind (bitmap file, audio file, etc.) 5030, a directory name 5040, and a drive name 5050 and is displayed in the menu format shown in FIG. 4. A user positions the mouse cursor to the corresponding item among 5020 to 5050 and clicks the mouse button (hereinafter, this operation is just referred to as "clicking by the mouse"). By doing this, a single or a plurality of files to be browsed can be selected.

An area 5060 comprises a plurality of icons 5070 and file names 5080 corresponding to the icons. Nothing is displayed in the area 5060 immediately after the browsing program is invoked.

To select an object for browsing, by clicking the corresponding icon 5070 by the left button of the mouse, one of the objects can be selected. When a file associated with an icon is audio and video, if the icon 5070 is selected continuously with the right button of the mouse held pressed for more than a fixed time (for example, about 2 seconds), the data is played from the beginning in the area 5070 during the pressing time. The icon of the mike shown in FIG. 4 is used for the associated file to browse audio. Therefore, to browse audio of the file "tiger, wav", the icon of the mike is selected continuously by the mouse. The audio and video browsing method will be explained later in detail.

When the first button 5090, the previous button 5100, the next button 5110, and the last button 5120 are pressed (the mouse cursor is moved and set to the corresponding button type display object and the mouse button is pressed; hereinafter, this operation is also just referred to as "clicking by the mouse"), the first, previous, next, and last pages of the icon selected by the aforementioned method can be displayed in the area 5070.

Next, command input for browsing will be explained. When the data display button 5130 is pressed, the browsing data associated with the file selected by 5020 to 5050 is displayed in the area 5060. In FIG. 4, the browsing data associated with "document. text" (the content of the text file in this case) is displayed.

When the data registration button 5140 is pressed, browsing data of the file selected by 5020 to 5050 is created and then displayed in the area 5060.

When the data update button 5150 is pressed, the browsing data is modified. Namely, the file selected by 5020 to 5050 and the browsing data file associated with the file are checked and the time of last modification of the file is compared with the time of last modification of the browsing data file. When the time of last modification of the file is newer, new corresponding browsing data is created and then displayed in the area 5060. When the data deletion button 5160 is pressed, the browsing data associated with the file selected by 5020 to 5050 is deleted.

When the registration setting button 5170 is pressed, a registration setting screen 6000 which will be explained next is displayed. When the end button 5189 is pressed, the search display screen 5010 is erased and the execution of the browsing program ends.

Next, the user interface when browsing data is registered will be explained with reference to FIG. 5. FIG. 5 is a drawing showing the registration setting screen of browsing data which is displayed on the display device 2040.

The registration setting screen 6000 is a screen for inputting the kind of file registration data to be registered as browsing data, the format of browsing data, and the maximum value of the number of pages of data to be registered.

An area 6010 for selecting the kind of registration data is an area for selecting the kind of application data to be registered (word processor data, spread sheet data, etc.).

An area 6020 for selecting the format of browsing data is an area for setting the format of browsing data to be created when browsing data is registered by using the compound document program. In this embodiment, the format of browsing data to be created is explained as being selected from the three items of text, bitmap, and graphic. An area 6030 for inputting the maximum value of the number of pages to be registered is an area for setting the maximum number of pages of browsing data. Browsing data is created within a range that the maximum number of pages does not exceed this value. For example, if 30 is inputted in this area when the application file covers 300 pages, browsing data in which only the first 30 pages can be browsed is created.

When a setting button 6040 is pressed, the set conditions are recorded in the registration setting table. When an end button 6050 is pressed, the registration setting ends and the registration setting screen 6000 is closed.

Compound Document Program

To create browsing data from the unique data of the application program and let a user select the format of browsing data, the compound document program is used in this embodiment.

The art for compound document is described in detail in Nikkei Open System, 1994, January issue, p. 143 to p. 150.

By the art for compound document, it is possible to request drawing of the content of an object (component) of a file and acquiring of data in the designated format. A program for realizing such a compound document function is a compound document program and by using it, browsing data in the format selected by a user can be created from the unique data of the application program.

Video and Audio Browsing Method

Next, a method for operating by a concept of a virtual page so as to browse video and audio with reference to FIGS. 13 to 15 will be explained.

Figure 13:
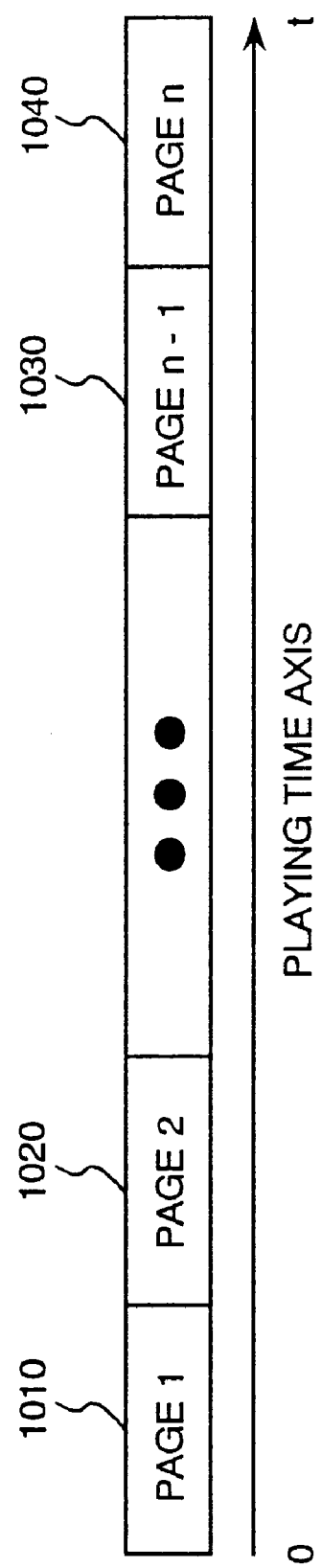
FIG. 13 is a schematic view when a concept of page is introduced to data having a playing time.

FIG. 13 is a schematic view when a concept of page is introduced to data having a playing time. A concept of page is generally used in a text file or a bitmap file so as to express the unit of one delimited data. On the other hand, in audio and video, a playing time is required for browsing, so that it is natural to classify data by it. Therefore, as shown in FIG. 13, a concept of page is also introduced to audio and video so as to operate them in page units. For page division, it is possible to divide the playing time of data equally or to set a given period of time which is set interactively by a user as a unit of one page. The acquisition process of this page unit is executed according to the browsing program 4050 and the page unit acquired in the program is stored. A method for playing only the designated section and a method for acquiring the position which is being played at present are described in detail in Interface Boot Trap Project-3, No. 5, p. 4 to p. 13.

Namely, by doing this, even in browsing of video and audio, operations such as first page display, previous page display, next page display, and last page display can be performed in the same way as with a text file and others.

In this case, the browsing operations of first page display and last page display can be easily understood, so that the browsing operations of previous page display and next page display will be explained in detail.

A case that the whole data is divided evenly in "a" pages is considered as a premise. Assuming the time for one page as t, the playing time of the whole data is at. Needless to say, it is possible to divide data into pages from the beginning at a fixed interval of time, for example, t=10 seconds. "t" may be a predefined value, a value designated by a user, or a value calculated on the basis of the playing time of the whole data.

Firstly, the operation of previous page display will be explained with reference to FIG. 14.

Figure 14:
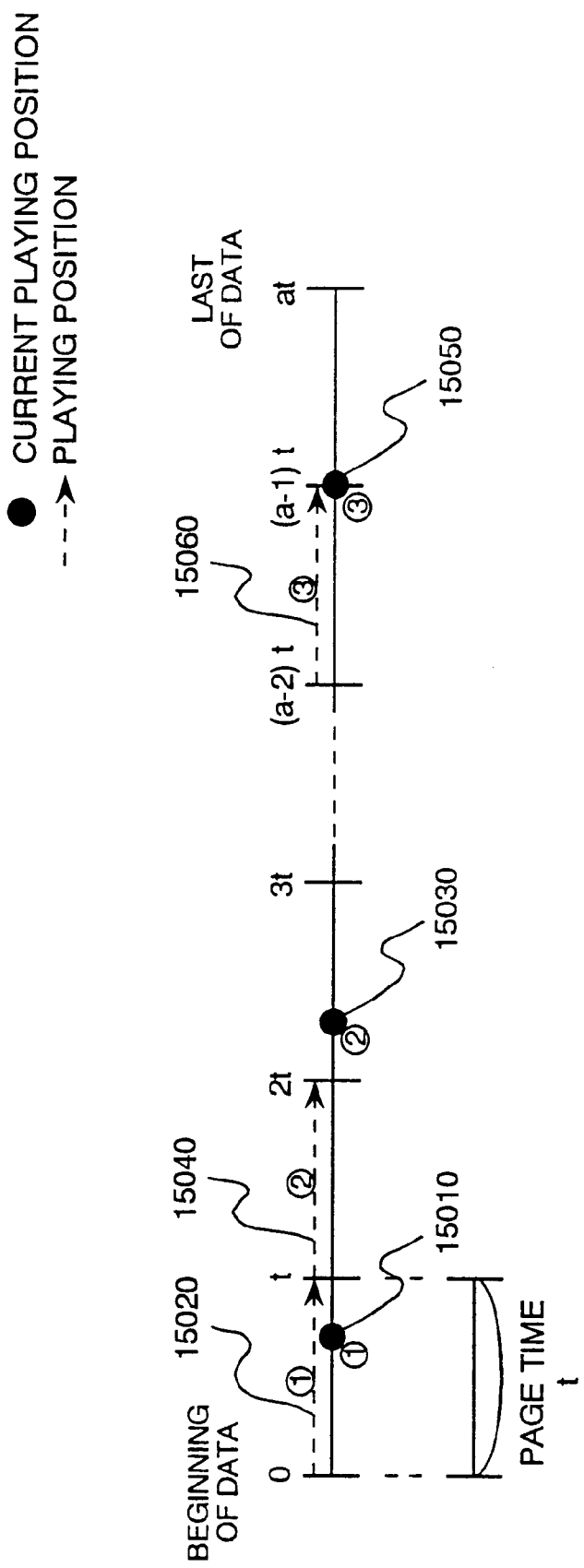
FIG. 14 is a schematic view in browsing of video and audio for illustrating the operation when the previous page is browsed.

FIG. 14 is a schematic view in browsing of video and audio for illustrating the operation when the previous page is browsed.

In FIG. 14, assuming numerals 15010, 15030, and 15050 as file playing positions when previous page display is instructed, 15020, 15040, and 15060 indicate ranges of playing for browsing according to the instruction respectively. Namely, the same circled numbers shown in the drawing correspond to each other as the playing position and the playing range at the instructed point of time. The instruction of previous page display can be realized by pressing the previous button 5100 shown in FIG. 4.

In FIG. 14, when previous page display is instructed at the playing time within page 3 at 15030, the 2nd page is played ((2)). When the playing position of the file is 15010 and previous page display is instructed at the playing time within page 1, there exists no previous page, so that the first page is played ((1)). When the playing position of the file is a critical position like 15050 and previous page display is instructed, the range of 15060 which is a page corresponding to the page earlier than the time is played ((3)).

Next, the operation of next page display will be explained with reference to FIG. 15. FIG. 15 is a schematic view in browsing of video and audio for illustrating the operation when the next page is browsed.

Figure 15:
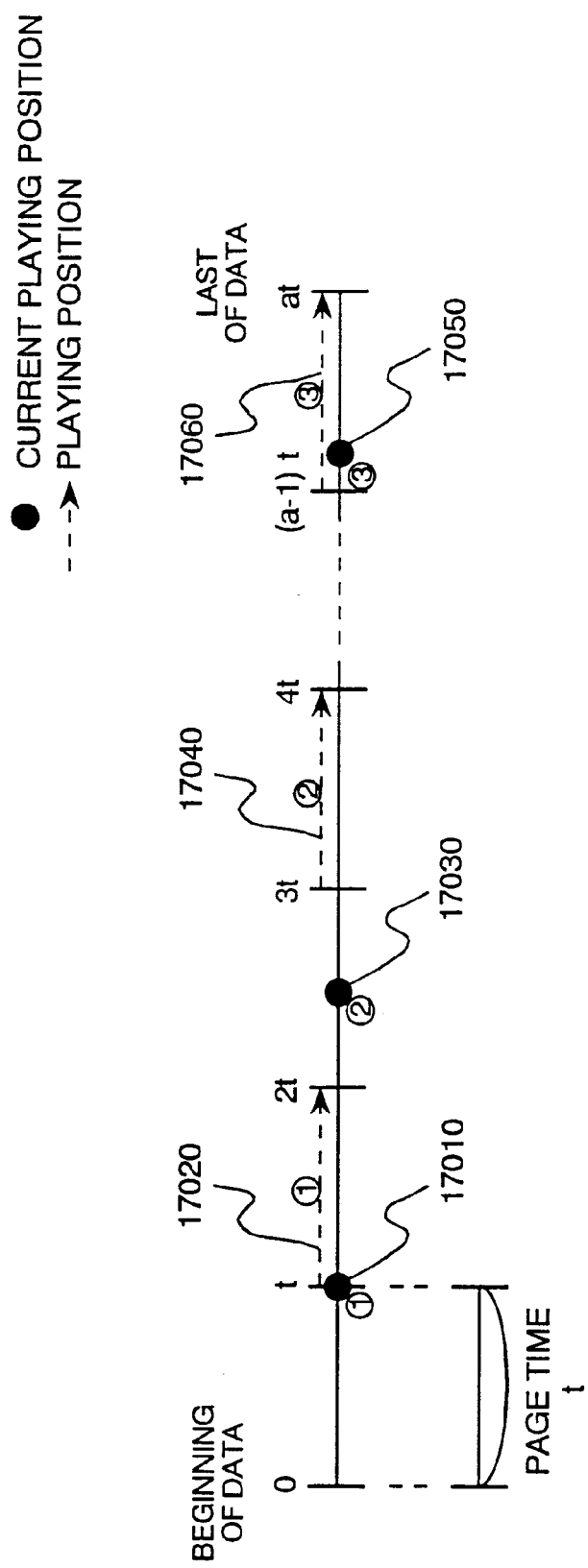
FIG. 15 is a schematic view in browsing of video and audio for illustrating the operation when the next page is browsed.

In FIG. 15, assuming numerals 17010, 17030, and 17050 as file playing positions when next page display is instructed, 17020, 17040, and 17060 indicate ranges of playing for browsing according to the instruction respectively. Namely, also in this case, the same circled numbers shown in the drawing correspond to each other as the playing position and the playing range at the instructed point of time.

In FIG. 15, when next page display is instructed at the playing time within page 3 at 17030, the 4th page is played ((2)). When the playing position of the file is 17050 and next page display is instructed at the playing time within the last page, there exists no next page, so that the last page is played ((3)). When the playing position of the file is a critical position like 17010 and next page display is instructed, the range of 17020 which is a page corresponding to the page behind the time is played ((3)).

Browsing data management table, registration setting table Next, the data structure of the browsing data management table and the registration setting table will be explained with reference to FIGS. 7 and 9.

FIG. 7 is a schematic view of the browsing data management table. The browsing data management table comprises an application data file name 8020, a browsing data file name 8010 associated with it, and an application data kind (text, video, audio, etc.) thereof 8030. By referring to the table, the browsing program can check whether there exists browsing data associated with the application data or not and can access the associated browsing data on the basis of the file name of the application data. The application data kind 8030 can be discriminated from the extender of the file name of the application data. For example, when the extender is text, the kind is discriminated as a text file and when the extender is avi, the kind is discriminated as a video file.

FIG. 9 is a schematic view of the registration setting table. The registration setting table comprises an application data kind 10010, a format of browsing data to be created 10020, and a maximum number of pages to be registered 10030. The condition set on the registration setting screen 6000 is stored in this table and referred to when browsing data is created. The format of browsing data to be created 10020 is an effective condition only when browsing data is created by using the compound document program. It is assumed that conditions which can be designated in this embodiment are three of text, graphic, and bitmap.

Outline of processing of the information searching apparatus Next, the rough processing flow of the information processing searching apparatus of the present invention will be explained with reference to FIGS. 1 to 3. When the browsing program 4050 is executed, it is necessary to load the device driver, the OS, the window system, and the compound document program 3010 into the main memory 2060 from the magnetic disk drive beforehand (4010, 4020, 4030) and put them into the executable state by the CPU 2010.

The browsing program, although not shown in the drawing, is invoked by clicking the icon indicating the browsing program double by the mouse 2020 (the left button of the mouse is pressed continuously two times) by a user or inputting the specified command from the keyboard 2030. When invoked, the browsing program is stored in the main memory 2060 and executed by the CPU 2010.

As an operation for browsing, using the mouse 2020 and the keyboard 2030, the user can input or select various processes and can display, register, modification, or delete browsing data of the designated file.

Browsing data is displayed by the browsing data management unit 4060 and the browsing data display unit 4070. The browsing data management unit checks whether there exists browsing data corresponding to the designated file or not by referring to the browsing data management table 3060. When browsing data exists or the designated file is graphic, text, or audio, the browsing data display unit outputs the data to the display 2040 or the speaker 2050. Browsing data is registered by the browsing data management unit 4060, the browsing data display unit 4070, and browsing data creation unit 4080.

The browsing data management unit checks whether there exists browsing data corresponding to the designated file or not by referring to the browsing data management table 3060. When no browsing data exists, the browsing data creation unit creates browsing data on the basis of the setting of the registration setting table 3070 and records necessary information in the browsing data management table. When browsing data is created by using the compound document program, the browsing data creation unit requests and acquires data in the designated format for the application program 4040 which creates the designated file via the compound document program 4030. The browsing data display unit outputs the data to the display 2040 or the speaker 2050.

Browsing data is modified by the browsing data management unit 4060, the browsing data display unit 4070, the browsing data creation unit 4080, and browsing data deletion unit 4090.

The browsing data management unit checks whether there exists browsing data corresponding to the designated file or not by referring to the browsing data management table 3060. When browsing data exists, the browsing data management unit checks which has a newer time of last modification, the designated file or the corresponding browsing data file thereto. When the designated file is newer, the browsing data deletion unit deletes the browsing data and the browsing data creation unit creates it again. The browsing data display unit outputs the browsing data to the display 2040 or the speaker 2050.

Browsing data is deleted by the browsing data management unit 4060 and the browsing data deletion unit 4090. The browsing data management unit checks whether there exists browsing data corresponding to the designated file or not by referring to the browsing data management table 3060. When browsing data exists, the browsing data deletion unit deletes the browsing data and deletes the item also from the browsing data management table.

Detailed processing of the information searching apparatus Next, detailed processing of the information searching apparatus of the present invention will be explained by using FIGS. 6 and 8 to 17 with reference to FIGS. 4, 5, 7, and 9.

(I) Whole processing of the Browsing Program

Figure 6:
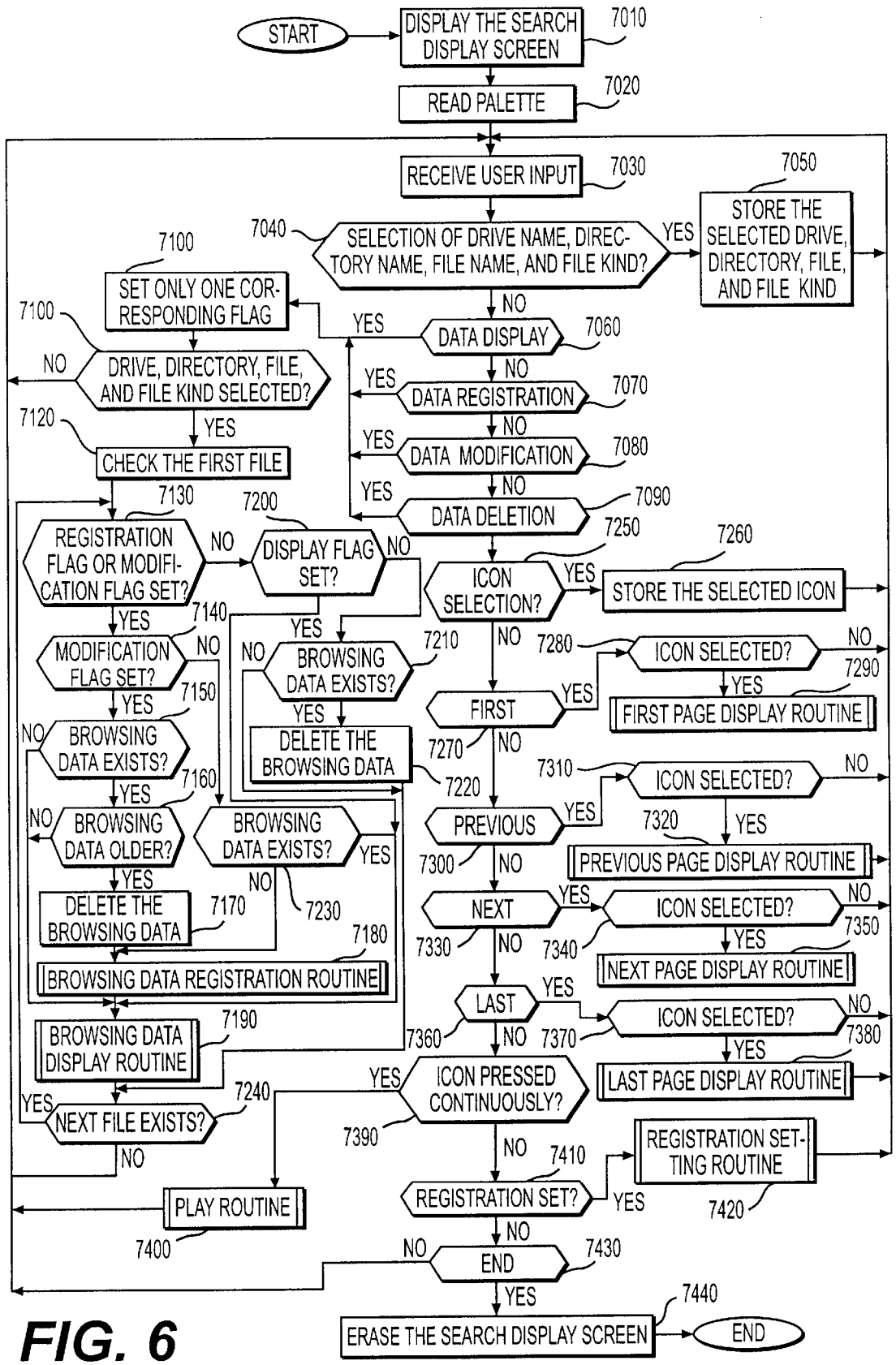
FIG. 6 is a flow chart showing the whole processing of the browsing program of the present invention.

Firstly, the whole processing of the browsing program will be explained according to the procedure shown in FIG. 6. FIG. 6 is a flow chart showing the whole processing of the browsing program of the present invention.

When the program is started by the predetermined operation, the search display screen 5010 shown in FIG. 4 is displayed (Step 7010). Next, the program reads the general purpose pallet which is prepared beforehand (Step 7020). When bitmap is displayed in this program hereafter, the general purpose palette is used.

Next, the program receives user input (Step 7030). The program inputs or selects the drive, directory, and file or file kind to be searched for by using 5020 to 5050 shown in FIG. 4 (Step 7040). The program stores the result (Step 7050) and returns to Step 7030.

When one of the data display button 5130, the data registration button 5140, the data modification button 5150, and the data deletion button 5160 shown in FIG. 4 is pressed (Step 7060, 7070, 7080, or 7090), the program sets only the flag corresponding to the button (display flag, registration flag, modification flag, or deletion flag) and turns the other flags off (Step 7100).

Next, the program checks whether the drive, directory, file, and file kind are selected by 5020 to 5050 or not (Step 7110) and when they are not selected, the program returns to Step 7030. When they are selected, the program checks the first selected file (Step 7120).

When the modification flag is set (Steps 7130, 7140), the program checks whether there exists browsing data associated with the application data or not by referring to the browsing data management table shown in FIG. 7 (Step 7150).

When browsing data exists, the program compares the time of last modification of the application data with that of the browsing data (Step 7160). When the browsing data is older, the program deletes the browsing data file, deletes the corresponding item also from the browsing data management table shown in FIG. 7 (Step 7170), and moves to Step 7240 via the browsing data registration routine (Step 7180) and the browsing data display routine (Step 7190).

The browsing data registration routine and the browsing data display routine will be explained later with reference to FIGS. 11 and 12.

When no browsing data exists at Step 7150 or the browsing data is newer at Step 7160, the program moves to Step 7190.

When the registration flag is set (Steps 7130, 7140), the program checks whether there exists browsing data associated with the application data or not by referring to the browsing data management table shown in FIG. 7 (Step 7230). When browsing data exists, the program moves to Step 7190 and when no browsing data exists, the program moves to Step 7180.

When the display flag is set (Steps 7130, 7200), the program moves to step 7230. When the deletion flag is set (Steps 7130, 7200), the program checks whether there exists browsing data associated with the application data or not by referring to the browsing data management table shown in FIG. 7 (Step 7210). When no browsing data exists, the program moves to Step 7240 and when browsing data exists, the program deletes the browsing data file, deletes the corresponding item also from the browsing data management table (Step 7220), and moves to Step 7240.

At Step 7240, the program checks whether there exists the next file or not. When browsing data exists, the program moves to Step 7130 and when no browsing data exists, the program moves to Step 7030.

When the data display button 5130, the data registration button 5140, the data modification button 5150, and the data deletion button 5160 are not pressed at Steps 7060 to 7090 and one of the icon 5070 is selected (Step 7250), the program stores the selected icon (Step 7260) and returns to Step 7030.

When the first button 5090 is pressed (Step 7270), the program checks whether the icon is selected or not (Step 7280). When the icon is not selected, the program moves to Step 7030 as it is and when the icon is selected, the program returns to Step 7030 via the first page display routine (Step 7290). The first page display routine will be explained later by referring to FIG. 16.

When the previous button 5100 is pressed (Step 7300), the program checks whether the icon is selected or not (Step 7310). When the icon is not selected, the program moves to Step 7030 as it is and when the icon is selected, the program returns to Step 7030 via the previous page display routine (Step 7320). The previous page display routine will be explained later by referring to FIG. 17.

When the next button 5110 is pressed (Step 7330), the program checks whether the icon is selected or not (Step 7340). When the icon is not selected, the program moves to Step 7030 as it is and when the icon is selected, the program returns to Step 7030 via the next page display routine (Step 7350). The next page display routine will be explained later by referring to FIG. 18.

When the last button 5120 is pressed (Step 7360), the program checks whether the icon is selected or not (Step 7370). When the icon is not selected, the program moves to Step 7030 as it is and when the icon is selected, the program returns to Step 7030 via the last page display routine (Step 7380). The last page display routine will be explained later by referring to FIG. 19.

When the icon 5070 is continuously selected with the right button of the mouse pressed (Step 7390), the program returns to Step 7030 via the play routine (Step 7400). The play routine will be explained later by referring to FIG. 10.

When the registration setting button 5170 is pressed (Step 7410), the program moves to Step 7030 via the registration setting routine 7420. The registration setting routine will be explained later by referring to FIG. 8.

When the end button 5180 is pressed (Step 7430), the program erases the search display screen (Step 7440) and ends the browsing program. When the end button 5180 is not pressed, the program returns to Step 7030.

(II) Processing of the Registration Setting Routine

Figure 8:
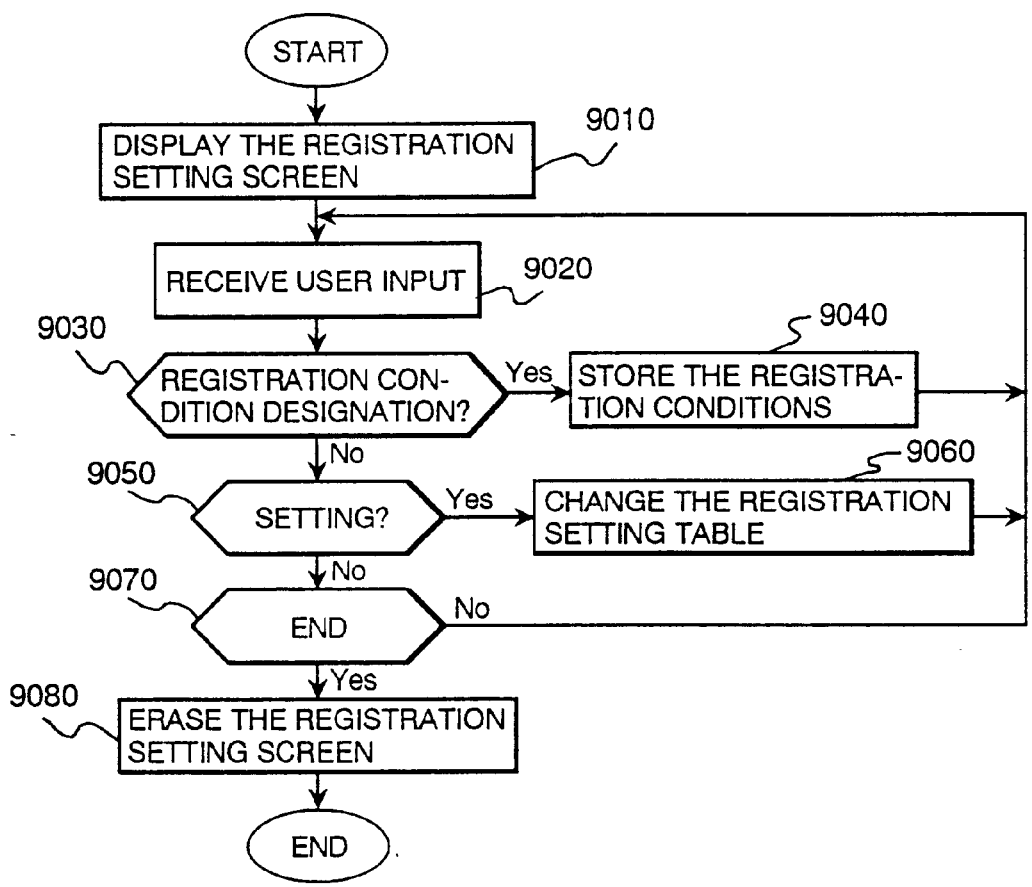
FIG. 8 is a flow chart showing the registration setting routine in the flow chart shown in FIG. 6.

Next, detailed processing of the registration setting routine will be explained according to the procedure shown in FIG. 8. FIG. 8 is a flow chart showing the registration setting routine in the flow chart shown in FIG. 6.

Firstly, the program displays the registration setting screen 6000 (Step 9010) and receives user input (Step 9020). When the registration conditions are designated by using 6010 to 6030 (Step 9030), the program stores them (Step 9040) and returns to Step 9020.

When the setting button 6040 is pressed (Step 9050), the program registers the stored registration conditions in the registration setting tables 10010 to 10030 (Step 9060) and returns to Step 9020.

When the setting button 6040 is not pressed, the program checks whether the end button 6050 is pressed or not (Step 9070). When the end button 6050 is not pressed, the program returns to Step 9020. When the end button 6050 is pressed, the program erases the registration setting screen 6000 (Step 9080) and ends the registration setting routine.

(III) Processing of the Play Routine

Figure 10:
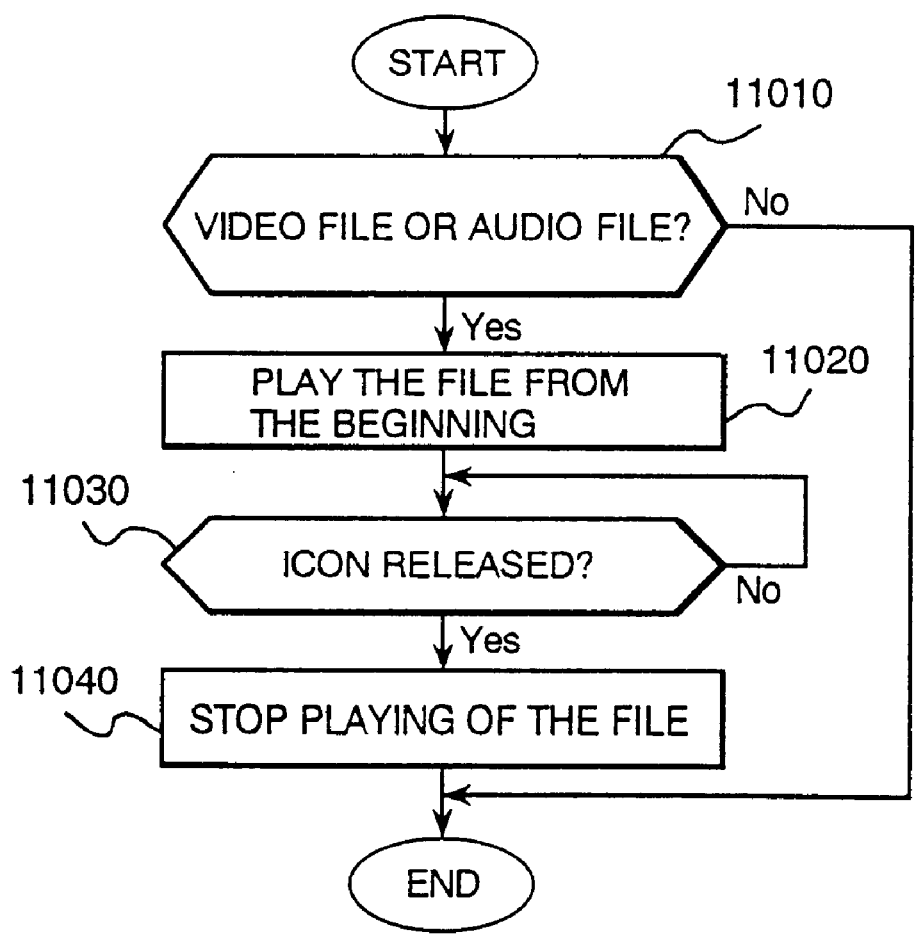
FIG. 10 is a flow chart showing the play routine in the flow chart shown in FIG. 6.

Next, detailed processing of the play routine will be explained according to the procedure shown in FIG. 10. FIG. 10 is a flow chart showing the play routine in the flow chart shown in FIG. 6.

Firstly, the program checks whether the file associated with the icon which is continuously selected with the right button of the mouse pressed is a video file or an audio file (Step 11010). When the file is a video file or an audio file, the program plays the file from the beginning in the area 5070 (Step 11020) and continues to play it until the right button is released (Step 11030).

When the right button is released, the program stops playing of the file (Step 11040) and ends the play routine.

If the file associated with the icon which is continuously selected with the right button of the mouse pressed is neither a video file nor an audio file, the program ends the play routine without doing anything.

(IV) Processing of the Browsing Data Registration routine.

Next, detailed processing of the browsing data registration routine will be explained according to the procedure shown in FIG. 11.

Figure 11:
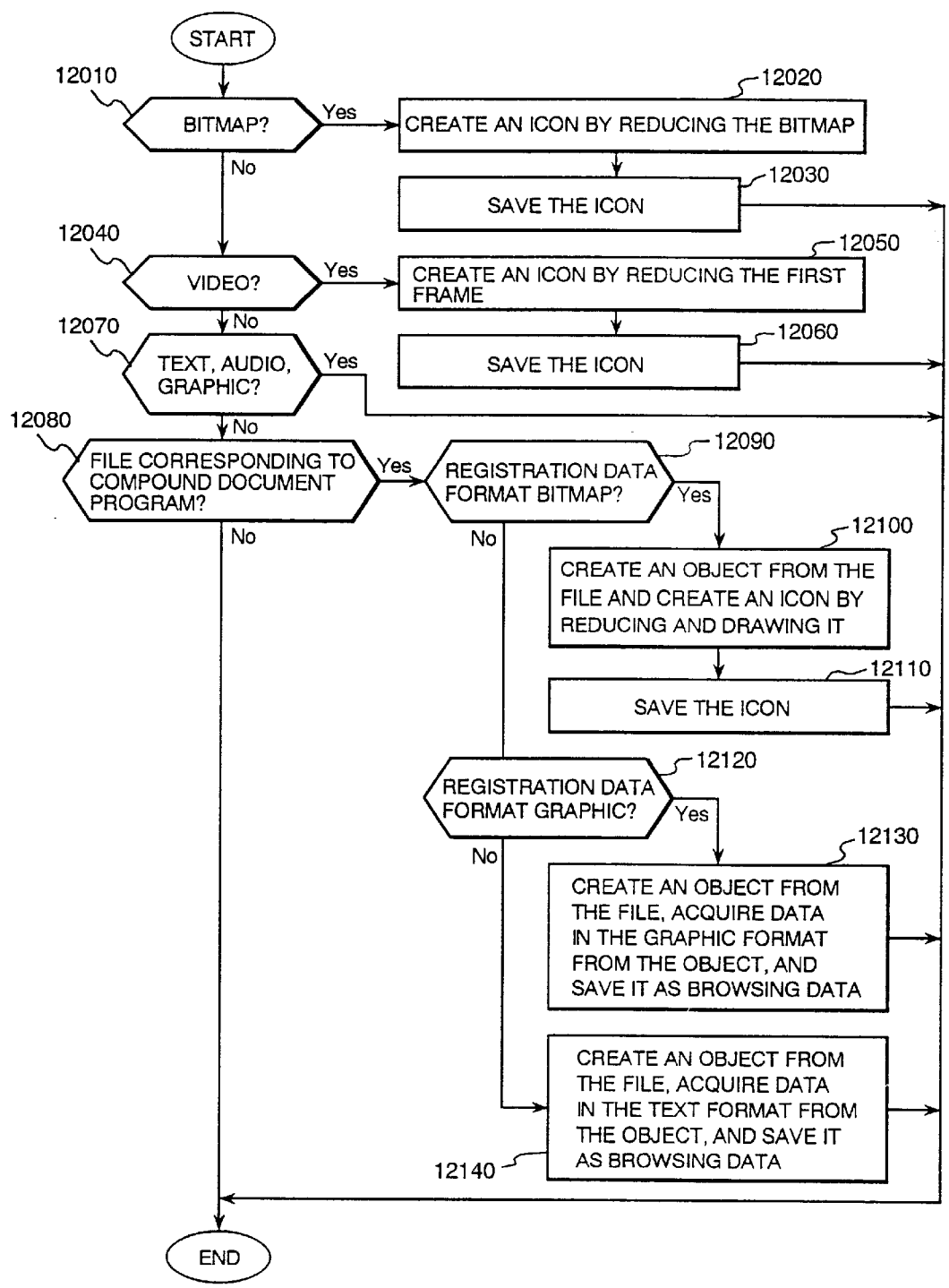
FIG. 11 is a flow chart showing the browsing data registration routine in the flow chart shown in FIG. 6.

FIG. 11 is a flow chart showing the browsing data registration routine in the flow chart shown in FIG. 6. When the selected file is a bitmap file (Step 12010), the program creates an icon by reducing the bitmap (Step 12020). The program saves the icon as browsing data, adds it to the browsing data management table shown in FIG. 7 (Step 12030), and ends the browsing data registration routine.

When the selected file is a video file (Step 12040), the program creates an icon by reducing the first frame (Step 12050). The program saves the icon as browsing data, adds it to the browsing data management table (Step 12060), and ends the browsing data registration routine.

When the selected file is one of the text file, graphic file, and audio file (Step 12070), the program executes nothing and ends the browsing data registration routine.

When the file is a file other than the aforementioned files and can be processed by the compound document program (Step 12080), the program refers to the registration setting table shown in FIG. 9 and checks the browsing data format 10020 to be registered from the application file kind 10010.

When the registration data format is bitmap (Step 12090), the program creates an object from the file by the compound document program and creates an icon by reducing and drawing it. Thereafter (Step 12100), the program saves the icon as browsing data, adds it to the browsing data management table shown in FIG. 7 (Step 12110), and ends the browsing data registration routine.

When the registration data format is graphic (Step 12120), the program creates an object from the file by the compound document program, acquires data in the graphic format from the object, and saves it as browsing data. The program adds the corresponding item to the browsing data management table (Step 12130) and ends the browsing data registration routine.

When the registration data format does not correspond to any of the above two formats, it is the text format. Therefore, the program creates an object from the file by the compound document program, acquires data in the text format from the object, and saves it as browsing data. The program adds the corresponding item to the browsing data management table shown in FIG. 7 (Step 12140) and ends the browsing data registration routine.

When data obtained at Steps 12100, 12130, and 12140 extends over a plurality of pages, the program checks the upper limit 10030 of the number of pages which is stored in the registration setting table shown in FIG. 9 and can be registered. When the number of pages is more than the upper limit, the program saves the data from the first page to the page of the upper limit as browsing data.

When the file does not correspond to any of the above cases, the program executes nothing and ends the browsing data registration routine.

(IV) Processing of the Browsing Data Display Routine

Next, detailed processing of the browsing data display routine will be explained according to the procedure shown in FIG. 12.

Figure 12:
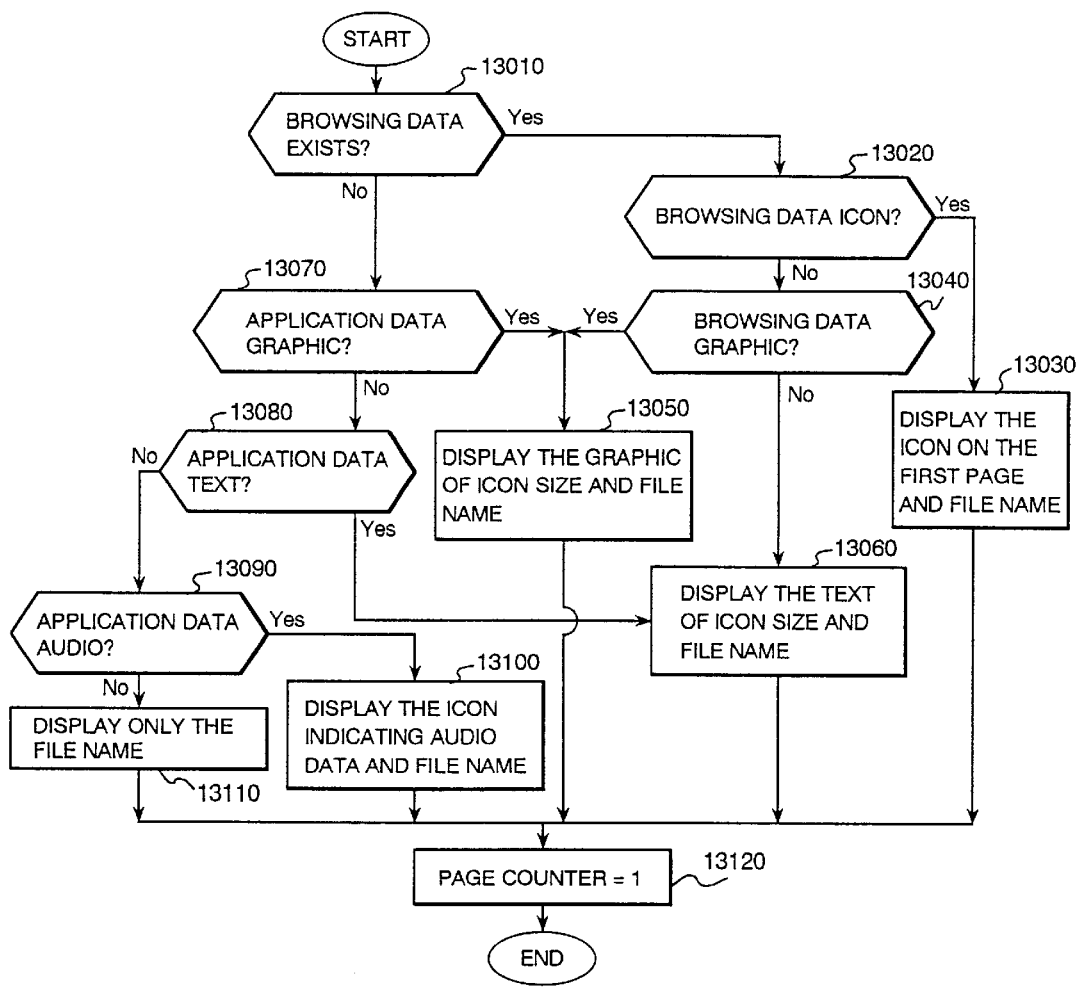
FIG. 12 is a flow chart showing the browsing data display routine in the flow chart shown in FIG. 6.

FIG. 12 is a flow chart showing the browsing data display routine in the flow chart shown in FIG. 6. Firstly, the program checks whether there exists browsing data associated with the file or not from the application data file name by referring to the browsing data management table shown in FIG. 7 (Step 13010). When browsing data exists, the program checks whether the browsing data is an icon or not (Step 13020). When the browsing data is an icon, the program displays the icon on the first page in the area 5070 and the file name in the area 5080 (Step 13030) and moves to Step 13120.

When the browsing data is not an icon, the program checks whether the browsing data is graphic data or not (Step 13040). When the browsing data is graphic data, the program displays the graphic data in size of the icon in the area 5070 shown in FIG. 4 and the file name in the area 5080 (Step 13050) and moves to Step 13120.

When the browsing data is not graphic data, the browsing data is text data, so that the program displays the text data in size of the icon in the area 5070 and the file name in the area 5080 (Step 13060) and moves to Step 13120.

When browsing data associated with the file does not exist, the program checks whether the data in the file is graphic data or not (Step 13070). When the data is graphic data, the program moves to Step 13050. When the data in the file is not graphic data, the program checks whether the data is text data or not (Step 13080). When the data is text data, the program moves to Step 13060.

When the data in the file is not text data, the program checks whether the data is audio data or not (Step 13090). When the data is audio data, the program displays the icon indicating an audio file which is prepared beforehand (the icon of the mike in FIG. 4) in the area 5070 and the file name in the area 5080 (Step 13100) and moves to Step 13120.

When the data in the file is not audio data, the program displays only the file name in the area 5080 (Step 13110) and moves to Step 13120.

At Step 13120, the program sets 1 in the page counter indicating the page which is displayed at present and ends the browsing data display routine.

(V) Processing of the First Page Display Routine, previous page display routine, next page display routine, and last page display routine The first page display routine, the previous page display routine, the next page display routine, and the last page display routine will be explained hereunder.

As in the "video and audio browsing method", the whole data is divided evenly in "a" pages and it is assumed that the time for one page is t.

(V-1) Processing of the First Page Display Routine

Firstly, detailed processing of the first page display routine will be explained according to the procedure shown in FIG. 16.

Figure 16:
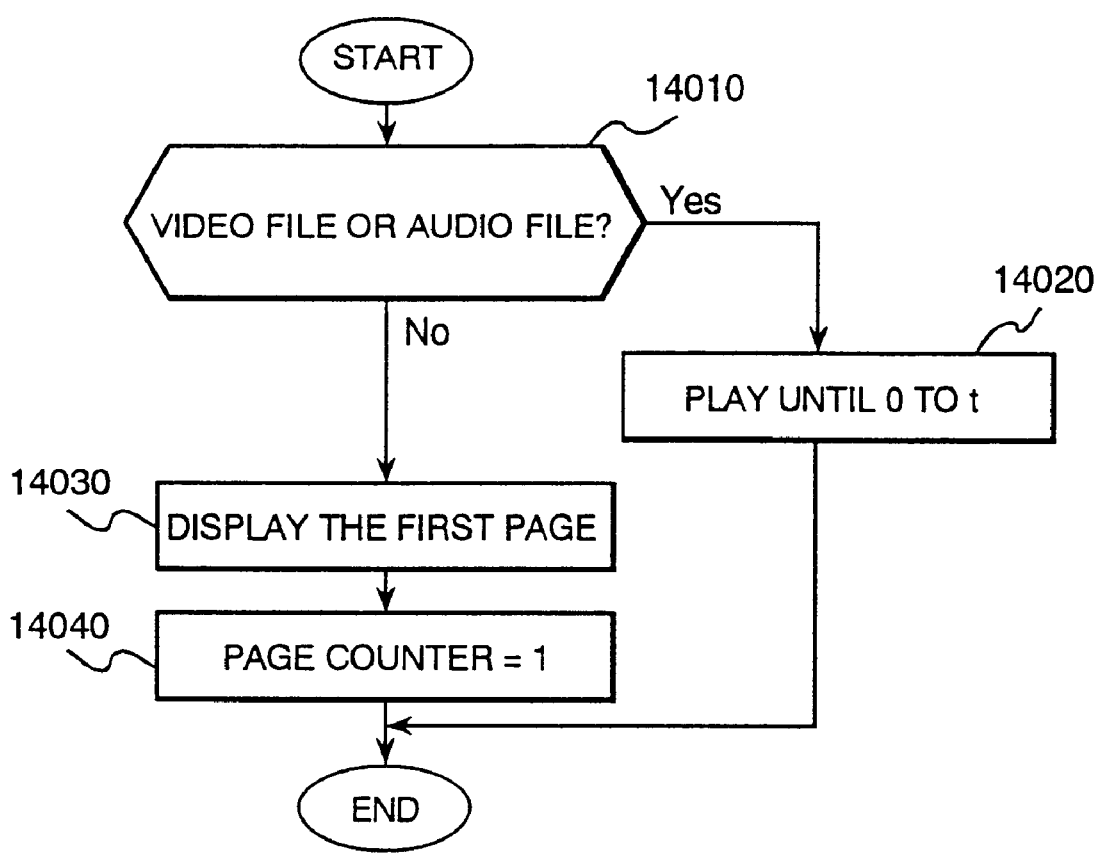
FIG. 16 is a flow chart showing the first page display routine in the flow chart shown in FIG. 6.

FIG. 16 is a flow chart showing the first page display routine in the flow chart shown in FIG. 6. Firstly, the program checks whether the application data file associated with the selected icon is a video file or an audio file (Step 14010). When the application data file is a video file or an audio file, the program plays the data until the time 0 to t (Step 14020) and ends the first page display routine.

When the application data file is neither a video file nor an audio file, the program displays the first page in the area 5070 (Step 14030), sets the value of the page counter to 1

(Step 14040), and ends the first page display routine. When the icon displayed at present is already the first page, nothing occurs.

(V-2) Processing of the Previous Page Display Routine

Next, detailed processing of the previous page display routine will be explained according to the procedure shown in FIG. 17.

Figure 17:
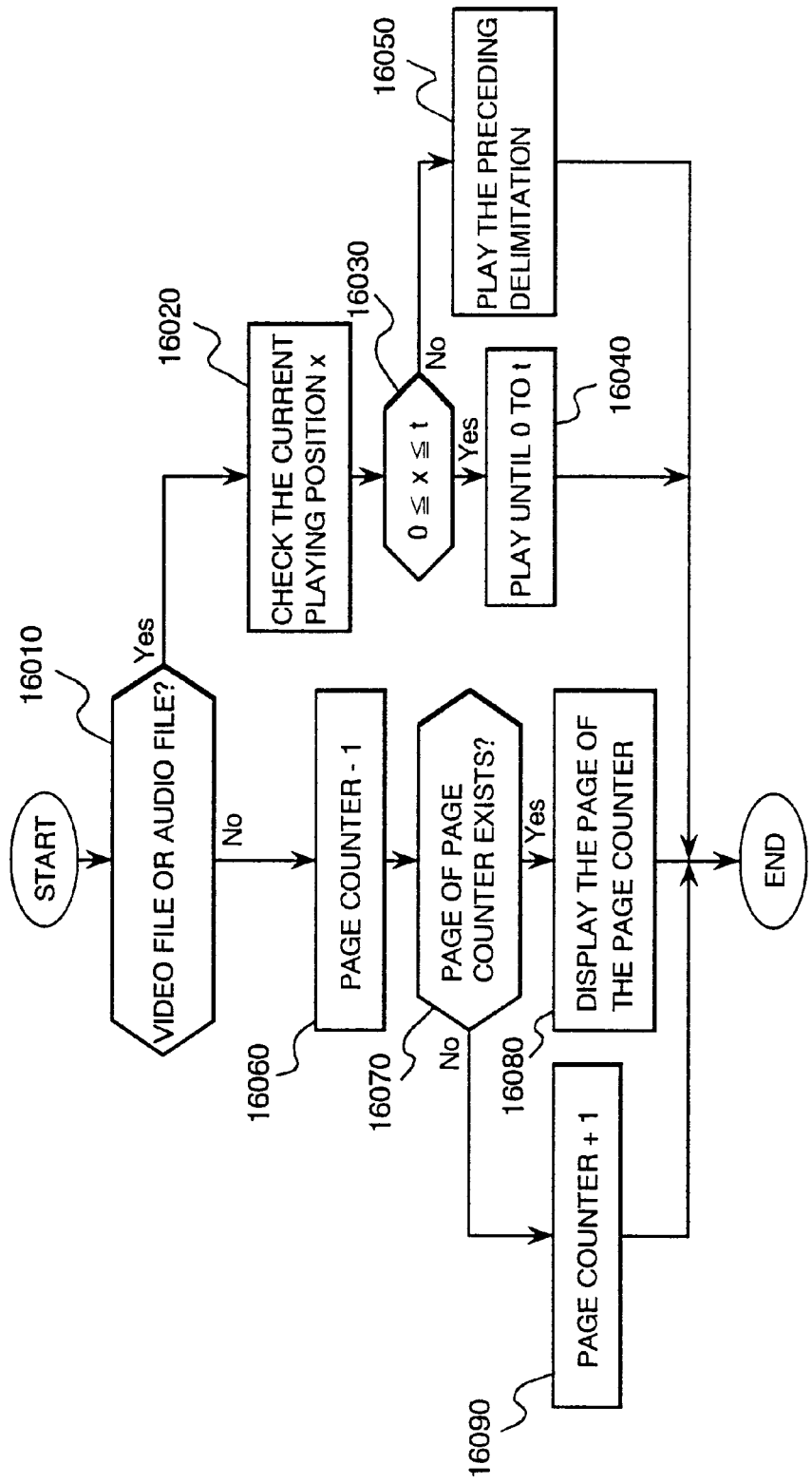
FIG. 17 is a flow chart showing the previous page display routine in the flow chart shown in FIG. 6.

FIG. 17 is a flow chart showing the previous page display routine in the flow chart shown in FIG. 6. Firstly, the program checks whether the application data file associated with the selected icon is a video file or an audio file (Step 16010). When the application data file is a video file or an audio file, the program checks the current playing position x (Step 16020). When x is within a time range from 0 to t (Step 16030), the program plays the data until the time 0 to t (Step 16040) and ends the previous page display routine. When x is beyond a time range from 0 to t, the program plays the previous delimitation (Step 16050) and ends the previous page display routine.

When the application data file is neither a video file nor an audio file (Step 16010), the program subtracts 1 from the page counter (Step 16060) and checks whether there exists the page of the page counter or not (Step 16070). When pages of the page counter exist, the program displays the page of the page counter (Step 16080) and ends the previous page display routine. When the page of the page counter does not exists, the program adds 1 to the page counter (Step 16090) and ends the previous page display routine.

(V-3) Processing of the Next Page Display Routine

Next, detailed processing of the next page display routine will be explained according to the procedure shown in FIG. 18.

Figure 18:
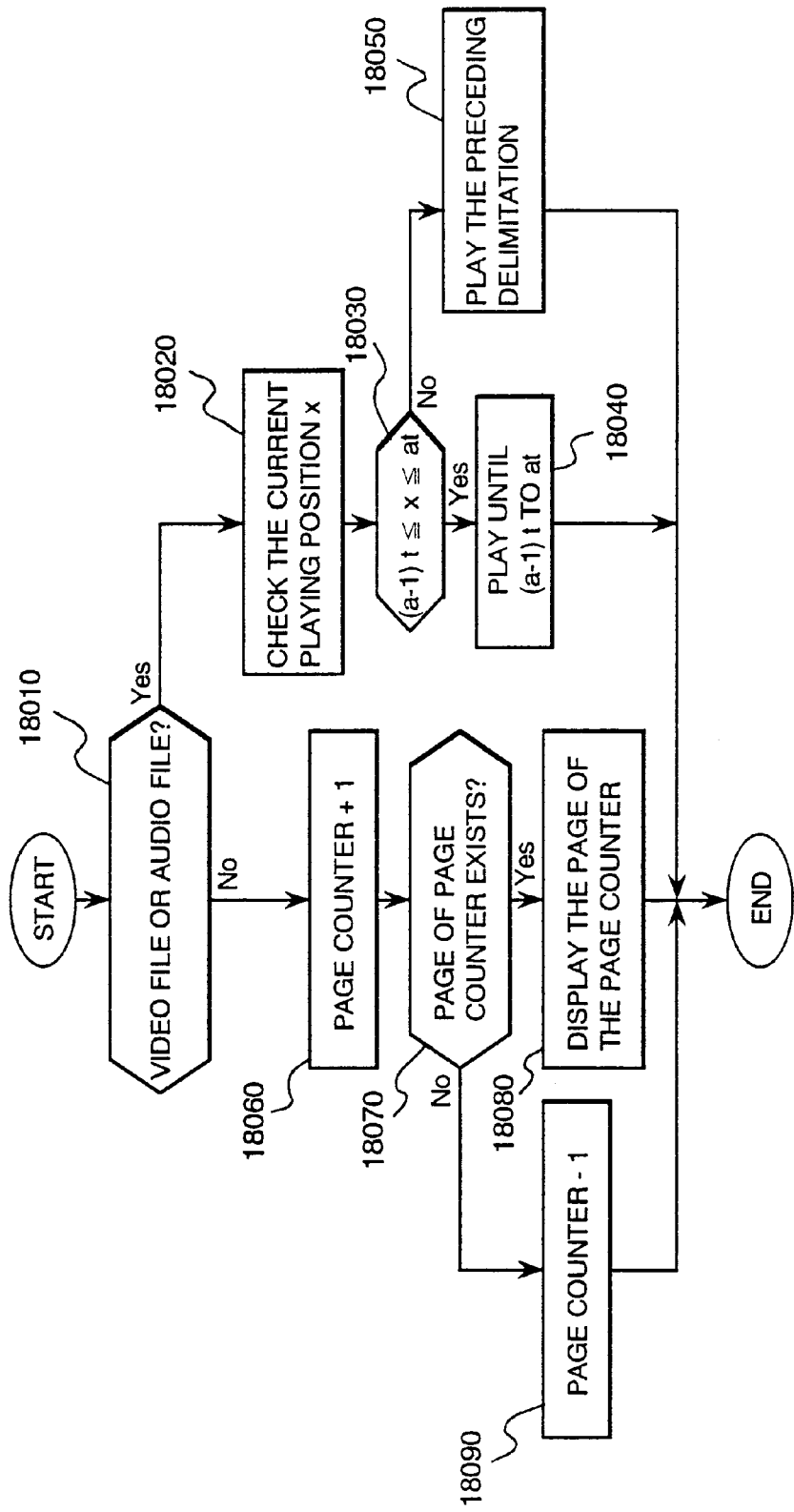
FIG. 18 is a flow chart showing the next page display routine in the flow chart shown in FIG. 6.

FIG. 18 is a flow chart showing the next page display routine in the flow chart shown in FIG. 6. Firstly, the program checks whether the application data file associated with the selected icon is a video file or an audio file (Step 18010). When the application data file is a video file or an audio file, the program checks the current playing position x (Step 18020). When x is within a time range from (a−1)t to at (Step 18030), the program plays the data corresponding to a time range from (a−1)t to at (Step 18040) and ends the next page display routine.

When x is beyond a time range from (a−1)t to at, the program plays the next delimitation (Step 18050) and ends the next page display routine.

When the application data file is neither a video file nor an audio file (Step 18010), the program adds 1 to the page counter (Step 18060) and checks whether there exists the page of the page counter or not (Step 18070). When the page of the page counter exists, the program displays the page of the page counter (Step 18080) and ends the next page display routine. When the page of the page counter does not exist, the program subtracts 1 from the page counter (Step 18090) and ends the next page display routine.

(V-4) Processing of the Last Page Display Routine

Next, detailed processing of the last page display routine will be explained according to the procedure shown in FIG. 19.

Figure 19:
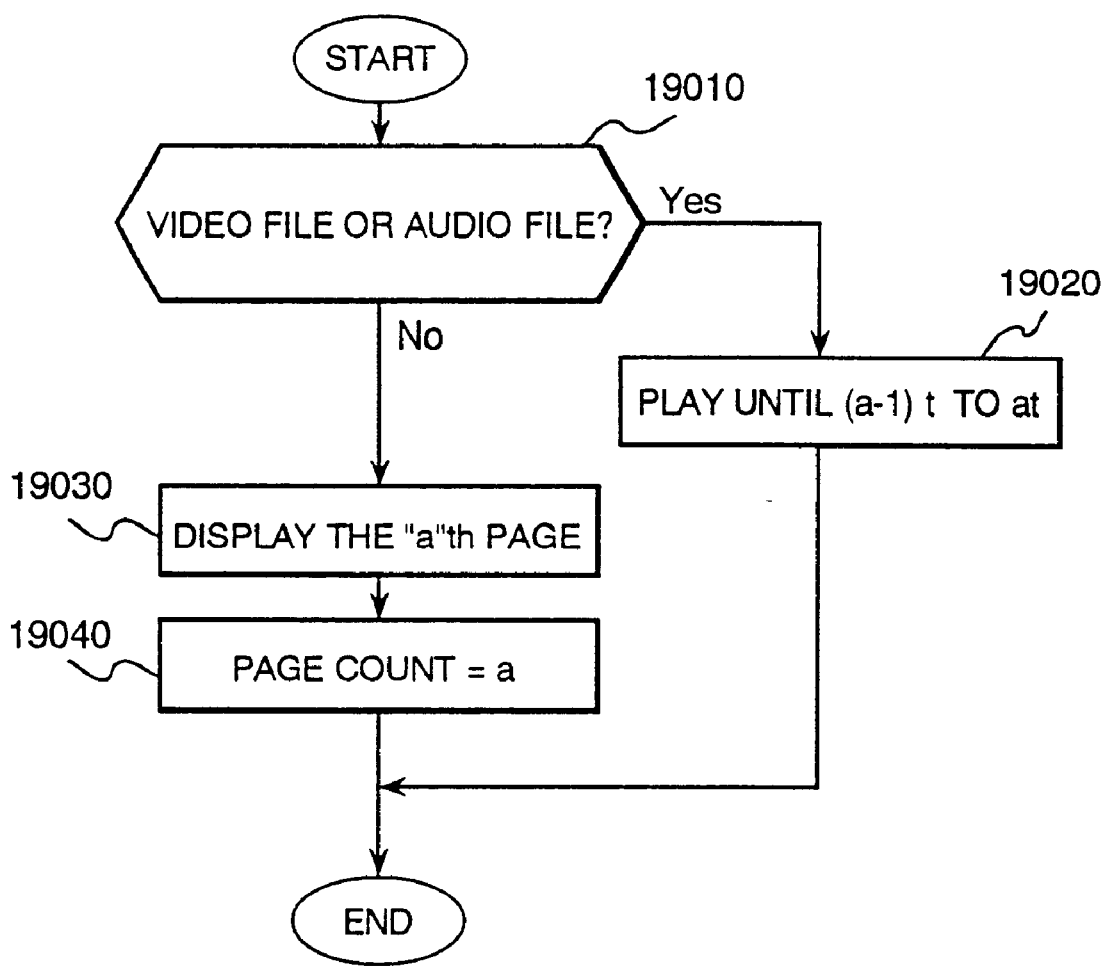
FIG. 19 is a flow chart showing the last page display routine in the flow chart shown in FIG. 6.

FIG. 19 is a flow chart showing the last page display routine in the flow chart shown in FIG. 6. Firstly, the program checks whether the file associated with the selected icon is a video file or an audio file (Step 19010).

When the file is a video file or an audio file, the program plays the data corresponding to a time range from (a−1)t to at (Step 19040) and ends the last page display routine.

When the file is neither a video file nor an audio file (Step 18010), the program displays the "a"th page (Step 19030), sets the value of the page counter to a (Step 19040), and ends the last page display routine.

Application Example of the Present Invention

In the aforementioned embodiments, only three kinds of browsing data formats are created by the compound document program such as bitmap, graphic, and text. However, any other kinds of browsing data may be created if the data format thereof can be created by the compound document program and is suited to browsing.

In the embodiments, the compound document program is used. However, there are no restrictions on the compound document program. Any other art for acquiring data in a specific format, which is suitable browsing data, from a file may be used. As such an art, a clip board art is described in Interface Boot Trap Project-3, No. 3, p. 106 to 125.

In the embodiments, the upper limit of the number of pages of browsing data which can be registered can be set by a user. However, it is possible to automatically decide the upper limit of the number of pages depending on the usable remaining capacity of a memory for saving browsing data. In this case, the usable remaining capacity of the memory is checked before creating browsing data and the value when the remaining capacity is divided by a fixed number is taken as an upper limit. For example, when the remaining capacity is 30 mega bytes and the fixed number is 6, the upper limit of the number of pages is the 5th page.

In the embodiments, browsing data is displayed, registered, or modified by pressing the corresponding button. However, it is possible to automatically display, register, or modify a file to be browsed at the same time that it is designated. Furthermore, it is optionally possible to decide by a user whether this operation is performed by pressing a button or automatically.

According to the present invention, a method for creating browsing data of an information searching apparatus which can create browsing data simply by using the existing art so as to create browsing data can be provided.

According to the present invention, a method for searching information by which the format of browsing data to be created can be changed when browsing data is created, so that even if browsing data of many files is created, the capacity of a memory necessary to save the data can be reduced can be provided.

According to the present invention, a method for searching information for browsing video or audio by designating only the portion to be browsed can be provided.

According to the present invention, a method for searching information by which a maximum value of the capacity of browsing data can be provided, so that even if the original application data is large, the capacity of a memory necessary to save browsing data can be reduced can be provided.

What is claimed is:

1. A browsing data creation system of an information searching apparatus comprising:

data storage means for storing data to be searched for;

input means for inputting an instruction to said information searching apparatus;

browsing data creation means for creating browsing data from said data stored in the data storage means; and output means for outputting said browsing data;

wherein said apparatus has a data storage means for storing the browsing data and when the browsing data can be searched by a page, an upper limit of a number of pages of the browsing data is determined by an available capacity of said data storage means which can be allocated for storing said browsing data.

2. A browsing data creation system of an information searching apparatus comprising:

data storage means for storing plural kinds of data to be searched for, each of said data having a data format corresponding to a kind of said data;

input means for inputting an instruction to said information searching apparatus;

browsing data creation means for creating browsing data from said data stored in the data storage means according to an instructed data format inputted by said input means; and output means for outputting said browsing data, wherein said apparatus has means for inputting an upper limit of a number of pages created by said browsing data creation means when the browsing data is to be searched by a page and said inputted upper limit of the number of pages is an upper limit of a number of pages of said created browsing data.

3. A browsing data creation system of an information searching apparatus comprising:

data storage means for storing plural kinds of data to be searched for, each of said data having a data format corresponding to a kind of said data;

input means for inputting an instruction to said information searching apparatus;

browsing data creation means for creating browsing data from said data stored in the data storage means according to an instructed data format inputted by said input means; and output means for outputting said browsing data;

wherein an icon for instructing said output means to play said browsing data is displayed, said browsing data being played when said icon receives an instruction from said input means to continuously output the browsing data.

4. A browsing data creation system of an information searching apparatus comprising:

data storage means for storing plural kinds of data to be searched for, each of said data having a data format corresponding to a kind of said data;

input means for inputting an instruction to said information searching apparatus;

browsing data creation means for creating browsing data from said data stored in the data storage means according to an instructed data format inputted by said input means; and output means for outputting said browsing data;

wherein said data to be searched for having a time based axis is divided into page units and said input means inputs an instruction to the information searching apparatus to search in page units.

5. An information searching system according to claim 4, wherein said division in page units is obtained by dividing a playing time of said browsing data equally.

6. An information searching system according to claim 4, wherein said division in page units is obtained by allocating pages of an assumption that a playing time of said browsing data is constant.

* * * * *